US010462241B2

(12) United States Patent
Addepalli et al.

(10) Patent No.: US 10,462,241 B2
(45) Date of Patent: *Oct. 29, 2019

(54) INTERPROGRAM COMMUNICATION WITH EVENT HANDLING FOR METRIC OVERLAYS

(71) Applicant: BANK OF AMERICA CORPORATION, Charlotte, NC (US)

(72) Inventors: Veerasekhar Addepalli, Levittown, PA (US); Ajinkya Atul Bokil, Hamilton Township, NJ (US)

(73) Assignee: Bank of America Corporation, Charlotte, NC (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/263,719

(22) Filed: Sep. 13, 2016

(65) Prior Publication Data

US 2018/0077221 A1  Mar. 15, 2018

(51) Int. Cl.
*H04L 29/08* (2006.01)
*G06F 16/958* (2019.01)

(52) U.S. Cl.
CPC ............ *H04L 67/22* (2013.01); *G06F 16/958* (2019.01); *H04L 67/02* (2013.01)

(58) Field of Classification Search
CPC ..... H04L 67/10; H04L 67/1076; H04L 67/02; H04L 67/18
See application file for complete search history.

(56) References Cited

U.S. PATENT DOCUMENTS

| 2008/0148293 | A1* | 6/2008 | Cowham | G06F 9/542 719/321 |
| 2013/0314214 | A1* | 11/2013 | Leica | H04W 4/80 340/10.1 |
| 2015/0082326 | A1* | 3/2015 | Milliron | G06F 9/542 719/318 |
| 2016/0019600 | A1* | 1/2016 | Smith | G06Q 30/0277 705/7.29 |
| 2016/0162140 | A1* | 6/2016 | Nasson | H04L 67/02 715/738 |

* cited by examiner

*Primary Examiner* — Brian J. Gillis
*Assistant Examiner* — Chhian (Amy) Ling
(74) *Attorney, Agent, or Firm* — Michael A. Springs

(57) ABSTRACT

A web service tagging tool including a memory operable to store logging tags and a web service application. The web service application includes a tagging engine configured to send data content comprising one or more logging tags for a user interface of a user application. Each logging tag is linked to an element of the user interface that comprises a hyperlink and location information identifying a location of the element in the user application. The web service application further includes a data collection engine configured to receive data for the element linked with the one or more logging tags and aggregate the received data for each of the one or more logging tags. The web service application further includes a metric overlay engine configured to generate overlay data for an overlay mapping the aggregated data to elements of the user interface and send the overlay data to the user application.

20 Claims, 9 Drawing Sheets

▽ PERSONAL INFORMATION                                    * REQUIRED

ARE YOU A PERMANENT RESIDENT OF THE UNITED STATES? *
  ○ YES        ○ NO
    —114         —114

COUNTRY OF CITIZENSHIP? *

114 —○ UNITED STATES

114 —○ ANOTHER COUNTRY

114 —○ DUAL CITIZENSHIP

FIRST NAME *         MI        LAST NAME *
[            ]      [  ]      [              ] —114
         —114         —114

PERMANENT ADDRESS
[                        ] —114

CITY *              STATE *    ZIP CODE *
[            ]      [ ▽ ]      [              ] —114
         —114         —114

DATE OF BIRTH *                SOCIAL SECURITY NUMBER *
[            ]                 [              ] —114
         —114

[ CANCEL ]—116                            [ SUBMIT ]—116

*FIG. 3*

TAG PUBLISHER

TAG PAGE LEVEL CONFIGURATION

502 {
- SITE ID
- PAGE ID (DEFAULT:DOCUMENT TITLE)
- PAGE URL

504 {
- TAG FLAG
  - ☐ USE POST (DEFAULT:GET)
  - ☐ FORCE HTTPS (DEFAULT:HTTP)
  - ☐ FIELD TAGS (DEFAULT:TRUE)

506 {
- CUSTOM CODE

[SUBMIT]

*FIG. 5*

TAG PUBLISHER

TAG SITE LEVEL CONFIGURATION

402 {
- SITE ID
- APPLICATION URL

404 {
- TAG FLAG
  - ☐ USE POST (DEFAULT:GET)
  - ☐ FORCE HTTPS (DEFAULT:HTTP)
  - ☐ FIELD TAGS (DEFAULT:TRUE)

406 {
- CUSTOM CODE

[SUBMIT]

*FIG. 4*

INTERPROGRAM COMMUNICATION WITH EVENT HANDLING FOR METRIC OVERLAYS

TECHNICAL FIELD

The present disclosure relates generally to communicating between multiple applications using triggering events, and more specifically to using interprogram communication with event handling across multiple applications.

BACKGROUND

Typically applications for a user device are coded with a predetermined set of features and functionalities. During the development of these applications, the applications are also coded to receive particular types of data inputs and to output some specified data. This provides predictability and application stability, but does not allow applications to communicate with other applications that may use different types of data conventions. In order to change the functionality or operation of an application, the source code of the application has to be modified and the user then has to download and/or install the modified version or release of the application. Modifying source code and releasing applications requires a significant amount of time and effort by developers and is not practical on a case-by-case basis. It is desirable to provide the ability for multiple applications to work cooperatively.

SUMMARY

In one embodiment, the disclosure includes a web service tagging tool that includes a memory operable to store logging tags and a web service application operably coupled to the memory. The web service application includes a tagging engine configured to send data content comprising one or more logging tags for a user interface of a user application. Each of the one or more logging tags is linked to an element of the user interface that comprises a hyperlink and location information identifying a location of the element in the user application. The web service application further includes a data collection engine configured to receive data for the element linked with the one or more logging tags and aggregate the received data for each of the one or more logging tags. The web service application further includes a metric overlay engine operably coupled to the data collection engine. The metric overlay engine is configured to generate overlay data for an overlay mapping the aggregated data to elements of the user interface of the user application and send the overlay data to the user application. The overlay displays the aggregated data overlaid with mapped elements on the user interface of the user device.

In another embodiment, the disclosure includes an interprogram overlaying method that includes sending data content comprising one or more logging tags for a user interface of a user application. Each of the one or more logging tags is linked to an element of the user interface that comprises a hyperlink and location information identifying a location of the element in the user application. The method further includes receiving data for the element linked with the one or more logging tags, aggregating the received data for each of the one or more logging tags, generating overlay data for an overlay mapping the aggregated data to elements of the user interface of the user application, and sending the overlay data to the user application. The overlay displays the aggregated data overlaid with mapped elements on the user interface of the user device.

In yet another embodiment, the disclosure includes a computer program product that includes executable instructions stored in a non-transitory computer readable medium such that when executed by a processor causes the processor to send data content comprising one or more logging tags for a user interface of a user application. Each of the one or more logging tags is linked to an element of the user interface that comprises a hyperlink and location information identifying a location of the element in the user application. The computer program product further includes instructions to receive data for the element linked with the one or more logging tags, aggregate the received data for each of the one or more logging tags, generate overlay data for an overlay mapping the aggregated data to elements of the user interface of the user application, and send the overlay data to the user application. The overlay displays the aggregated data overlaid with mapped elements on the user interface of the user device.

The present embodiment presents several technical advantages. In one embodiment, applications may employ interprogram communication to allow the applications to work cooperatively rather than independently. Allowing multiple applications to work cooperatively using interprogram communication with event handling provides several technical advantages by allowing the applications to interact with each other without using large applications that are coded to support numerous configurations and without having to create custom applications for different configurations. In one embodiment, applications may be configured to employ interprogram communication with event handling to provide subscription tagging. Using subscription tagging allows a web service application to receive specific information that is dynamically defined by the web service application from the user application without modifying the source code of the user application. In another embodiment, applications may be configured to employ interprogram communication with event handling to provide overlays for a user application. Using overlays allows the user application to dynamically present information about elements to a user without having to modify the original source code of the user application. In another embodiment, applications may be configured to employ interprogram communication with event handling to provide online enhancements. Using online enhancements allows the web service application to customize information received from a user-application without modifying the source code of the user application.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a screenshot of an embodiment of a user interface of a user application;

FIG. 4 is a screenshot of an embodiment of a tag publisher for generating site level subscription tags;

FIG. 5 is a screenshot of another embodiment of a tag publisher for generating page level subscription tags;

DETAILED DESCRIPTION

Figure 1:
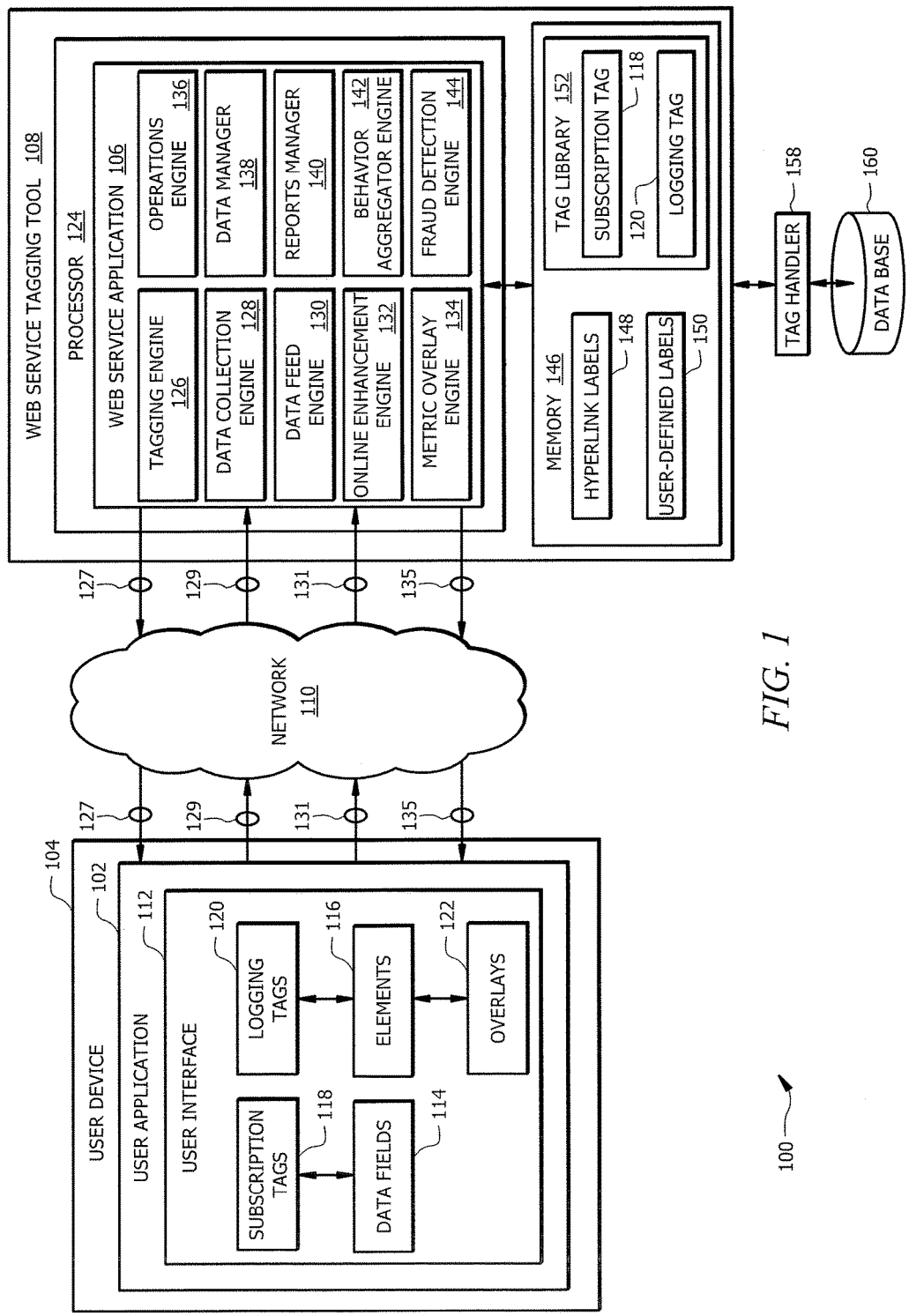
FIG. 1 is a schematic diagram of an embodiment of a web service tagging system for implementing interprogram communication with event handling between a user application and a web service application.

During the development cycle of applications, applications are coded with a particular set of features and functionalities which allow the applications to receive particular types of data inputs and to output some specified data. This provides predictability and application stability, but does not allow applications to communicate with other applications that may use different types of data conventions. Providing the ability for applications to communicate with other applications results in several technical problems and challenges. For instance, generating applications that can accommodate a wide variety of configurations for communicating with other applications would cause the application file size and development time to increase significantly, and therefore is not a practical solution. Applications are typically downloaded and installed onto user devices which may have small or limited amounts of memory. Large applications consume significant amounts of memory resources and degrade the performance of a user device. Changing the functionality or operation of an application means that the source code of the application has to be modified and the user then has to download and/or install the modified version or release of the application. Modifying source code and releasing applications require a substantial amount of time and effort and is not practical on a case-by-case basis.

Using applications configured to employ interprogram communication with event handling provides a technical solution to the previously mentioned technical problems. Interprogram communication with event handling allows multiple applications to exchange information that provides instructions for indicating when particular conditions or events have occurred within a first application. The indication of these conditions and events occurring in the first application may be used to trigger other events to occur within a second application. The first application and the second application may employ interprogram communication with event handling regardless of whether the first application and the second application are the same or different types of applications. Applications may employ interprogram communication to allow the applications to work cooperatively rather than independently. Allowing multiple applications to work cooperatively using interprogram communication with event handling provides several technical advantages by allowing the applications to interact with each other without using large applications that are coded to support numerous configurations and without having to create custom applications for different configurations.

In one embodiment, applications may be configured to employ interprogram communication with event handling to provide subscription tagging. Subscription tagging allows a user of a web service application to provide instructions for a user application to provide specific information in response to certain triggering events using subscription tags. For example, the web service application may provide one or more subscription tags to the user application which configures the user application to send certain data to the web service application in response to a triggering event defined by the web service application. The web service application may process and use the data received from the user application for various applications. For instance, the web service application may use data received from the user application to troubleshoot or diagnose problems with the user application and to detect malicious or suspicious activities by a user using a user application, or any other applications. Using subscription tagging allows a web service application to receive specific information that is dynamically defined by the web service application from the user application without modifying the source code of the user application.

In another embodiment, applications may be configured to employ interprogram communication with event handling to provide overlays for a user application. Overlays may be used to present information about how user's interact with elements (e.g. hyperlinks and advertisements) of a user application. A web service application may provide one or more logging tags to the user application which configured the user application to send data about the elements linked with the logging tags to the web service application. For example, the user application may send data to web service application in response to a user interacting (e.g. viewing or clicking on) with an element on a user interface of the user application. The web service application may process the data received from the user application to generate overlay data. The overlay data provides information about how users are interacting with elements of the user application. The web service application may send the generated overlay data to the user application. The user application may use the overlay data to present information about the elements linked with logging tags using overlays. The overlays allow the user application to present information about particular elements of the user interface directly with the elements, for example, by superimposing the information onto the elements. Using overlays allows the user application to dynamically present information about elements to a user without having to modify the original source code of the user application.

In another embodiment, applications may be configured to employ interprogram communication with event handling to provide online enhancements. Online enhancements allows a user of a web service application to subscribe to elements (e.g. hyperlinks, banners, and buttons) of a user application by assigning user-defined labels to elements of the user application. User-defined labels allow multiple users of the web service application to each define labels to elements based on their own interests. The web service application users may reassign existing default element labels with user-defined labels, which improve the efficiency of processing information about the elements. For example, web service application users may reassign elements to particular naming conventions that suits their needs. Using user-defined labels allows the web service application to customize information from a user-application without modifying the source code of the user application.

FIG. 1 is a schematic diagram of an embodiment of a web service tagging system 100 for implementing interprogram communication with event handling between a user application 102 in a user device 104 and a web service application 106 in a web service tagging tool 108. The web service tagging system 100 is configured such that the user device 104 communicates with the web service tagging tool 108 over a network 110.

Examples of the user device 104 include, but are not limited to, mobile phones, smart phones, notebook computers, tablet computers, desktop computers, or any other suitable device as would be appreciated by one of ordinary skill in the art upon viewing this disclosure. For example, the user device 104 may be a smart phone configured to receive inputs from a user via a touch screen. As an another example, the user device 104 may be a desktop computer configured to receive inputs from a user via a mouse and keyboard.

The user device 104 comprises one or more user applications 102. Examples of user applications 102 include, but are not limited to, mobile applications, desktop applications, web browsers, and email clients. User applications 102 may employ a user interface 112 configured to present information to a user. For example, a user interface 112 may be a graphical user interface (GUI), a web page, an email, or any other suitable user interface. The user interface 112 may be configured to display data content comprising a plurality of data fields 114 and/or elements 116. Data fields 114 may be features of the user interface 112 configured to receive an input from a user. For example, a data field 114 may be a text input field, a radio button, a drop down menu, clickable options, or any other suitable data input field.

Data fields 114 may be linked to one or more subscription tags 118. Examples of subscription tags 118 include, but are not limited to, files (e.g. application level files), JavaScript tags, and enterprise tags. In one embodiment, subscriptions tags 118 may be encoded or embedded within data content 127 sent from the web service application 106 to the user application 102. In another embodiment, subscription tags 118 may be published as application level files that are sent with data content 127 from the web service application 106 to the user application 102. For example, publishing the subscription tag 118 may allow the web service application 106 to store the original subscription tag 118 in memory 146 and to send a copy of the subscription tag 118 to the user application 102. Subscription tags 118 may be configured to link target data fields 114, location information about the target data fields 114, and triggering events for receiving data content from the target data fields 114. A triggering event may be one or more user actions and/or application events. For example, a user clicking a button on the user interface 112 of the user application 102 may be a triggering event. In another example, a series of actions by a user may be a triggering event. For instance, a user repeatedly trying to submit different passwords within a predetermined time period may be a triggering event. Triggering events may be described in terms of particular actions, number of times an action occurs, types of actions, time period for actions to occur within, and/or any other indicators, or combinations thereof. An example of using subscription tags 118 is described in FIG. 6.

Elements 116 may be interactive features of the user interface 112 that redirects a user or allows the user to view additional information or data content when a user interacts with an element 116. Examples of elements 116 include, but are not limited to, hyperlinks, buttons, radio buttons, tabs, and advertisement banners. Elements 114 may be linked to one or more logging tags 120 and overlays 122. Examples of logging tags 120 include, but are not limited to, JavaScript tags and enterprise tags. In one embodiment, logging tags 120 may be encoded or embedded within data content 127 sent from the web service application 106 to the user application 102. In another embodiment, logging tags 120 may be published as application level files that are sent with data content 127 from the web service application 106 to the user application 102. For example, publishing the logging tag 120 may allow the web service application 106 to store the original logging tag 120 in memory 146 and to send a copy of the logging tag 120 to the user application 102. Logging tags 120 may be configured to link target elements 116 with location information about the elements 116. The web service application 106 may use logging tags 120 to track the amount of or type of interactions a user has with the elements 116 of the user application 102. For example, a logging tag 120 may be employed to track how many times a user clicks on a hyperlink. An example of using logging tags 120 is described in FIG. 8. The user application 102 may use data received from the web service application 106 to present information to a user using overlays 122 for elements 116 on user interface 112 of the user application 102. For example, overlays 122 may be configured to display aggregated data from a logging tag 120 that is linked to an element 116 on the user interface 112. For example, an overlay 122 may present aggregated data about an element 116 by overlaying or superimposing the aggregated data onto the element 116 on the user interface 112. An example of an overlay 122 is described in FIG. 7.

The network 110 may comprise a plurality of network nodes configured to communicate data between the user application 102 and the web service application 106. Examples of network nodes include, but are not limited to, routers, switches, modems, web servers, enterprise tagging user interface servers, log collectors, and information loaders. The network 110 may be configured to communicate data (e.g. data content 127, server calls 129, data 131, and overlay data 135) between the user application 102 and the web service application 106. In one embodiment, the network 110 may comprise or may be a cellular network. In other embodiments, the network 110 may be any other suitable type of wireless and/or wired network. The network 110 may be configured to support any suitable communication protocols as would be appreciated by one of ordinary skill in the art upon viewing this disclosure.

Examples of a web service tagging tool 108 include, but are not limited to, notebook computers, tablet computers, desktop computers, servers, or any other suitable device as would be appreciated by one of ordinary skill in the art upon viewing this disclosure. The web service tagging tool 108 comprises one or more processors 124 configured to implement or execute a web service application 106. The processor 124 may be implemented as one or more central processing unit (CPU) chips, logic units, cores (e.g. as a multi-core processor), field-programmable gate arrays (FPGAs), application specific integrated circuits (ASICs), or digital signal processors (DSPs). The processor 124 may be operably coupled to or in data communication with a memory 146. The processor 124 is configured to receive and transmit electrical signals and may be operably coupled to one or more other devices (not shown).

The web service application 106 may comprise a tagging engine 126, a data collection engine 128, a data feed engine 130, an online enhancement engine 132, a metric overlay engine 134, an operations engine 136, a data manager 138, a report manager 140, a behavior aggregator engine 142, and a fraud detection engine 144. The tagging engine 126, the data collection engine 128, the data feed engine 130, the online enhancement engine 132, the metric overlay engine 134, the operations engine 136, the data manager 138, the reports manager 140, the behavior aggregator engine 142, and the fraud detection engine 144 may be implemented using logic units, FPGAs, ASICs, DSPs, or any other suitable hardware. The tagging engine 126, the data collection engine 128, the data feed engine 130, the online enhancement engine 132, the metric overlay engine 134, the operations engine 136, the data manager 138, the reports manager 140, the behavior aggregator engine 142, and the fraud detection engine 144 may also comprise any suitable set of instructions, logic, rules, or code operable to provide some functionality to the web service application 106. The web service application 124 may be configured as shown or in any other suitable configuration. For example, one or more engines or managers shown may be omitted. An example of a web service application 106 configuration employing the tagging engine 126, the data collection engine 128, the data feed engine 130, the online enhancement engine 132, the metric overlay engine 134, the operations engine 136, the data manager 138, the reports manager 140, the behavior aggregator engine 142, and the fraud detection engine 144 is described in FIG. 2.

The tagging engine 126 is configured to generate subscription tags 118 and logging tags 120 to the user application 102, to send data content 127 comprising subscription tags 118 and/or logging tags 120, and to store subscription tags 118 and logging tags 120 in memory 146 (e.g. tag library 152). The subscription tags 118 and/or logging tags 120 may be code, script, or tags that are embedded or encoded within the data content 127 that is sent to the user application 102. The tagging engine 126 may be configured to generate subscription tags 118 and logging tags 120 at the page level, the site level, or the application level. A page level subscription tag 118 or logging tag 120 is a tag that links data fields 114 or elements 116, respectively, within a particular webpage of a website. A site level subscription tag 118 or logging tag 120 is a tag that links data fields 114 or elements 116, respectively, across multiple webpages within a website. An application level subscription tag 118 or logging tag 120 is a tag that links data fields 114 or elements 116, respectively, within an application (e.g. a mobile application or desktop application). Examples of generating subscription tags 118 and logging tags 120 are described in FIGS. 4 and 5. An example of a process for providing a subscription tag 118 or logging tag 120 is described in FIG. 6.

An example algorithm for tagging engine 126 is as follows: receive a notification for generating a subscription tag 118 from a user; receive user input identifying a data field 114 in a user application 102, the location of the data field 114 in the user application 102, and a triggering event; compile the user input to generate code for the subscription tag 118; if data content 127 with the data field 114 is available to send to the user application 102, then embed the subscription tag 118 code with the data content 127 and send the data content 127 to the user application 102; if data content 127 with the data field 114 is not available to send to the user application 102, then allocate memory in the tag library 152 and store the subscription tag 118 code in the allocated memory.

Another example algorithm for a tagging engine 126 is as follows: receive a notification for generating a logging tag 120 from a user, receive user input identifying an element 116 in a user application 102; receive user input indicating a user-defined label 150; optionally, receiver user input indicating instructions for implementing an overlay 122; generate code for the association between the identified element 116, the user-defined label 150, and the overlay 122 instructions (if, provided) to generate a logging tag 120; if data content 127 with the element 116 is available to send to the user application 102, then embed the logging tag 120 code with the data content 127 and send the data content 127 to the user application 102; if data content 127 with the element 116 is not available to send to the user application 102, then allocate memory in the tag library 152 and store the logging tag 120 code in the allocated memory.

Another example algorithm for a tagging engine 126 is as follows: receive a notification for implementing online enhancements; receive user input identifying a report rule identifier; receive user input identifying one or more elements 116 and the location of each element 116 in the user application 102; identify a hyperlink label 148 assigned to each of the elements 116; receive a user input indicating one or more user-defined labels 150 for each of the identified element 116; store the mapping between the hyperlink labels 148 and the user-defined labels 150 in a look-up table in memory 146 using the report rule identifier; and send data content 127 comprising the identified element 116 to the user application 102.

The data collection engine 128 is configured to queue received data 131 from the user application 102 and to forward received data 131 to one or more other engines for processing. For example, the data collection engine 128 may be configured to organize received data 131 from the user application 102 and to route the received data 131 to the data feed engine 130. The data collection 128 may also be configured to collect device and/or server calls 129 and to manage tag collection source code.

An example algorithm for data collection engine 128 is as follows: wait for data 131 from the user application 102; receive data 131 from the user application 102; identify subscription tags 118 and logging tags 120 linked with the received data 131; send a request to the data manager 138 for routing instructions based on the subscription tags 118 and the logging tags 120 linked with the received data 131; receive routing instructions for the received data 131; append the routing instructions to the received data 131; and forward the received data 131 to the data feed engine 130.

Another example algorithm for data collection engine 128 is as follows: wait for data 131 from the user application 102; receive data 131 from the user application 102; identify a hyperlink label 148 linked with the received data 131; access a look-up table with mapping between hyperlink labels 148 and user-defined labels 150 to determine if a user-defined label 150 is mapped to the hyperlink label 148; if a mapping between the hyperlink label 148 and the user-defined label 150 exists, append the mapped user-defined label 150 to the data linked with the hyperlink label 148; send a request to the data manager 138 for routing instructions for the user-defined label 150 linked with the received data 131; receive routing instructions for the received data 131; append the routing instructions to the received data 131; and forward the received data 131 to the data feed engine 130.

The data feed engine 130 is configured to receive data 131, to generate one or more data feeds using the received data 131, and to forward the received data 131 as one or more of the data feeds to one or more other engines for processing. For example, the data feed engine 130 may be configured to generate a metric overlay engine data feed, an online enhancement engine data feed, an operations engine data feed, a behavior aggregator engine data feed, a fraud detection engine data feed, and/or any other type of data feed. Data feeds may be real-time data feeds that forward the received data 131 continuously in about real-time or non real-time data feeds that queue a predetermined amount of received data 131 before forwarding the received data 131.

An example algorithm for data feed engine 130 is as follows: receive data 131 from the data collection engine 128; identify routing instructions appended to the received data 131; parse the received data 131 based on user-defined labels 150, subscription tags 118, and logging tags 120 linked with the data 131; if the data 131 is linked with user-defined labels 150, request reporting rules from the reports manager 140, receive reporting rules from the reports manager 140, and append reporting rules to data linked with the user-defined labels 150; append a header for one or more data feeds to the parsed data based on the routing instructions; if a header appended to the parsed data identifies the metric overlay engine 134, then forward data to the metric overlay engine 134; if a header appended to the parsed data identifies the online enhancement engine 132, then forward data to the online enhancement engine 132; if a header appended to the parsed data identifies the operations engine 136, then forward data to the operations engine 136; if a header appended to the parsed data identifies the behavior aggregator engine 142, then forward data to the behavior aggregator engine 142, if a header appended to the parsed data identifies the fraud detection engine 144, then forward data to the fraud detection engine 144, and if a header appended to the parsed data identifies another device, then forward data to another.

The online enhancement engine 132 is configured to parse received data 131 based on the user-defined labels 150 assigned to one or more elements 116 (e.g. hyperlinks) and to compile reports using the received data 131 that are organized by the user-defined labels 150. Additional information about the online enhancement engine 132 is described in FIG. 2. An example of a processing employing the online enhancement engine 132 is described in FIG. 10.

An example algorithm for online enhancement engine 132 is as follows: receive a data feed 204 from the data feed engine 130; identify user-defined labels 150 linked with data in the data feed 204; parse the data based on the user-defined labels 150 and the reporting rules; sort the data based on the user-defined labels 150; and aggregate the data to compile one or more reports comprising the data organized user-defined labels 150.

The metric overlay engine 134 is configured to receive data 131 that comprises information about a user's interaction with one elements 116 of the user application 102, to generate overlay data 125 for overlays 122 that map collected data to elements 116 of the user interface 112. The metric overlay engine 134 provides the overlay data 135 to the user application 102 to present the aggregated data in the context of the elements 116 on the user interface 112 by using overlays 122. For example, the metric overlay engine 134 may provide overlay data 135 for overlays 122 that superimpose aggregated data with the elements 116 on the user interface 112. Additional information about the metric overlay engine 134 is described in FIG. 2. An example of a process for generating and providing overlay data 135 for overlays 122 is described in FIG. 8.

An example algorithm for metric overlay engine 134 is as follows: receive a data feed 204 from the data feed engine 130; parse the data feed 204 for logging tags 148 linked with the data in the data feed 204; identify elements 116 linked with the logging tags 148; aggregate data for each of the identified elements 116 to generate overlay data 135; optionally, append instructions or rules for implementing overlays 122 to the overlay data 135; and send the overlay data 135 to the user application 102.

The operations engine 136 is configured to use data 131 received from the user application 102 to troubleshoot a user's experience with the user application 102. For example, the operations engine 136 may receive data that comprises crash information and/or an audit of the user application 102 and may troubleshoot problems with the user application 102 based on the received crash information. Additional information about the operations engine 136 is described in FIG. 2.

An example algorithm for operations engine 136 is as follows: receive a data feed 204 from the data feed engine 130; parse the data in the data feed 204 for user information, touch screen gesture information, and a subscription tag 118 linked with the data in the data feed 204; identify an error code based on the user information, the touch screen gesture information, and the subscription tag 118 linked with the data in the data feed 204; look-up a diagnosis or solution from memory using the error code; and compile a crash report comprising the user information, the touch screen gesture information, error code, and identified diagnosis and solutions (if available).

The behavior aggregator engine 142 may be configured to aggregate data 131 received from the user application 102 based on the behavior of a user and/or the user application 102. For example, the behavior aggregator engine 142 may be configured to organize and/or analyze received data based on behavior of a user. Additional information about the behavior aggregator engine 142 is described in FIG. 2.

An example algorithm for behavior aggregator engine 142 is as follows: receive a data feed 204 from the data feed engine 130; parse data in the data feed 204 for user information and touch screen gesture information; and compile a behavior report comprising the user information and the touch screen gesture information.

The fraud detection engine 144 may be configured to aggregate data 131 from the user application 102 and to process the received data 131 to detect malicious activities (e.g. fraud) and/or other suspicious activities. In one embodiment, the fraud detection engine 144 may be configured to detect malicious activity based on triggering events that indicate malicious or suspicious activity by a user using the user application 102. In an embodiment, malicious activity may be identified using a malicious activity event identifier. Examples of malicious activity event identifiers include, but are not limited to, numeric codes, alphanumeric names, or any other suitable identifier. Additional information about the fraud detection engine 144 is described in FIG. 2.

An example algorithm for fraud detection engine 144 is as follows: receive a data feed 204 from the data feed engine 130; parse the data feed 204 for user information and information indicating actions made by a user (e.g. touch screen gesture information); identify a malicious activity event identifier based on the user information and the subscription tag 118 linked with the data in the data feed 204; and compile a fraud detection report comprising the user information, information indicating actions made by a user, and the malicious activity event identifier.

The data manager 138 is configured to control the routing of data 131 received from the user application 102 and to provide metadata for the received data 131. For example, the data manager 138 may be configured provide routing instructions that identifies one or more engines to forward the received data 131 towards. In another example, the data manager 138 may be configured to provide metadata that may be applied to the received data 131.

An example algorithm for data manager 138 is as follows: receive a request for routing instructions identifying a hyperlink label 148, a user-defined label 150, a subscription tag 118, and/or a logging tag 120; if the request comprises a hyperlink label 148 or a user-defined label 150, identify routing instructions for forwarding data linked with the hyperlink label 148 and/or the user-defined label 150 to the online enhancement engine 132 and send the routing instructions to the routing engine 202 and/or data feed engine 130; if the request comprises a subscription tag 118, identify routing instructions for forwarding data linked with the subscription tag 118 to the operations engine 136, the behavior aggregator engine 142, and/or the fraud detection engine 144 based on the subscription tag 118 and send the routing instructions to the routing engine 202 and/or data feed engine 130; and if the request comprises a logging tag 120, identify routing instructions for forwarding data linked with the logging tag 120 to the metric overlay engine 134 based on the logging tag 120 and send the routing instructions to the routing engine 202 and/or data feed engine 130.

The reports manager 140 is configured to control and customize metrics for data 131 received from the user application 102. For example, the reports manager 140 may be configured to provide reporting rules for the received data 131.

An example algorithm for reports manager 140 is as follows: wait for requests from the data feed engine 130; receive a request for reporting rules comprising a reporting rules identifier from the data feed engine 130; request a set of reporting rules from the tagging engine 126 using the reporting rules identifier; receive the set of reporting rules from the tagging engine 126; and send the reporting rules to the data feed engine 130.

The memory 146 may comprise one or more disks, tape drives, or solid-state drives, and may be used as an over-flow data storage device, to store programs when such programs are selected for execution, and to store instructions and data that are read during program execution. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may be operable to store hyperlink labels 146, user-defined labels 148, a tag library 152, and any other data or instructions.

Hyperlink labels 148 may be default labels that are assigned to elements 116 (e.g. a hyperlink) when the element 116 is created. A hyperlink label 148 may be a long character string that uses several symbols and is generally not legible. Hyperlink labels 148 may not follow naming conventions that allows them to be easily recognized and processed. User-defined labels 150 may be labels that are generated and assigned to an element 116 (e.g. a hyperlink) by a user. For example, a user may employ user-defined labels 150 when a hyperlink label 148 is a long character string that uses several symbols and/or is not legible. The user may generate a user-defined label 150 that is short and/or easier to read or recognize. The user may assign the generated user-defined label 150 to the element 116. The same user-defined labels 150 may be assigned to multiple elements 116, which may allow data to be collected for all the elements 116 assigned to the user-defined label 150. In one embodiment, user-defined labels 150 may be assigned to an element 116 that is located on multiple pages within a website. An example of using user-defined labels 150 is described in FIG. 9.

The tag library 152 may be operable to store subscription tags 118 and logging tags 120. For example, the tagging engine 126 may generate subscription tags 118 and logging tags 120 and may publish or save the subscription tags 118 and logging tags 120 in the tag library 152.

In one embodiment, the web service tagging system 100 may further comprise a tag handler 158 operably coupled to the web service tagging tool 108 and a database 160. The tag handler 158 may be configured to receive data from the web service tagging tool 108, to convert and/or organize the received data in accordance with a common format, and to forward the converted data to a database 160. In other words, the tag handler 158 may be configured to standardize data from the web service application 106 into a common format or template for storing in the database 160.

The database 160 is communicatively coupled to the web service tagging tool 108 via the tag handler 158. The database 160 may be configured to store information from the user application 102 and/or the web service application 106. In one embodiment, the database 160 may be external to the web service tagging tool 108. For example, the database 160 may be in a different geographical location than the web service tagging tool 108 and may be communicatively coupled to the web service tagging tool 108 using a network connection. In another embodiment, the tag handler and the database 160 may be integrated with the web service tagging tool 108.

Figure 2:
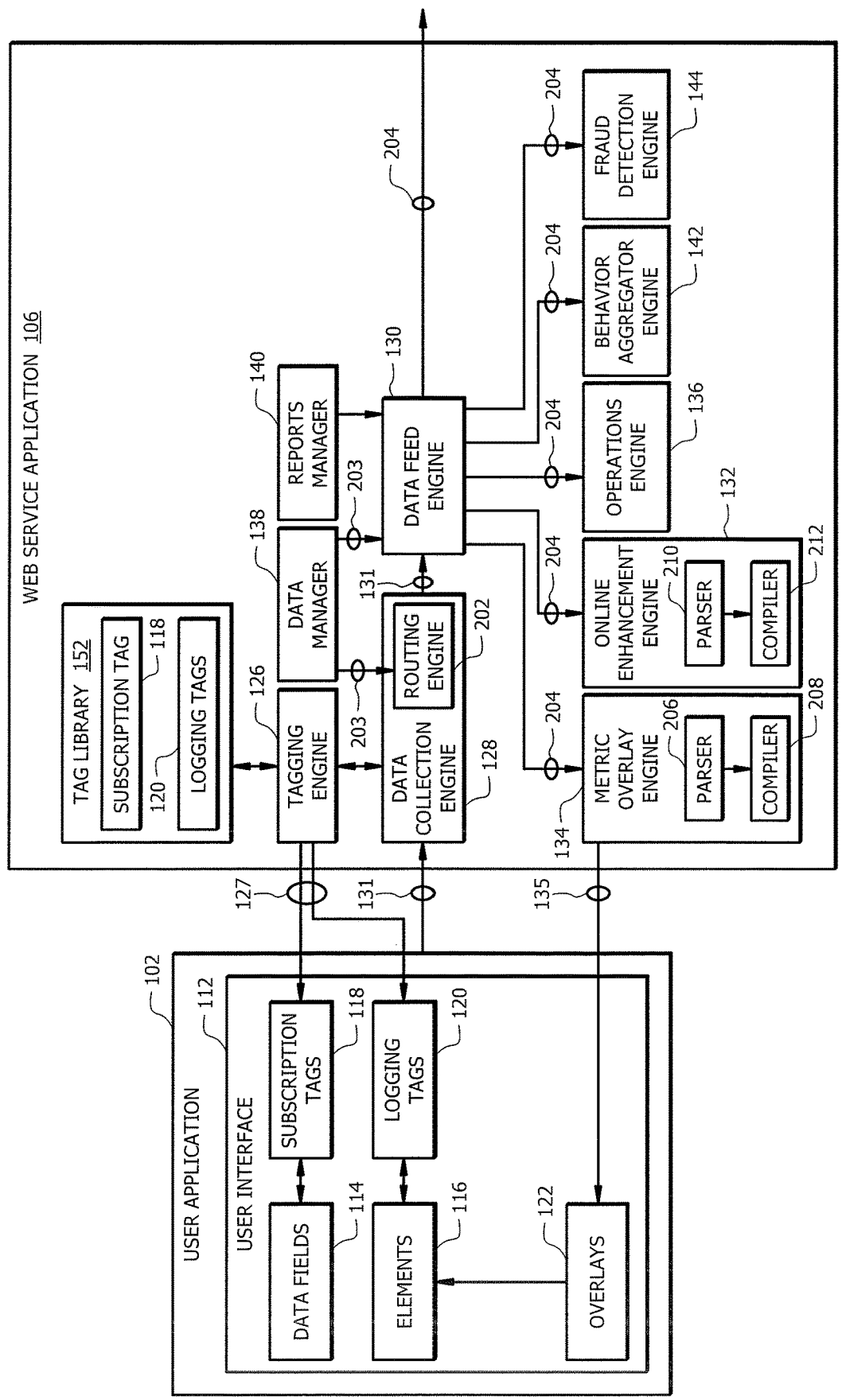
FIG. 2 is a schematic diagram of the user application configured to communicate with the web service application using interprogram communication with event handling.

FIG. 2 is a schematic diagram of the user application 102 configured to communicate with the web service application 106 using interprogram communication with event handling. The user application 102 and the web service application 106 are configured to exchange data (e.g. data content 127, data 131, and overlay data 135) with each other in response to triggering events between the user application 102 and the web service application 106. In one embodiment, the user application 102 and the web service application 106 are configured to use interprogram communication to configure the user application 102 and the web service application 106 for implementing subscription tagging. An example of a subscription tagging process is described in FIG. 6. In another embodiment, the user application 102 and the web service application 106 are configured to use interprogram communication to configure the user application 102 and the web service application 106 for implementing overlays 122. An example of a overlay 122 process is described in FIG. 8. In another embodiment, the user application 102 and the web service application 106 are configured to use interprogram communication to configure the user application 102 and the web service application 106 for implementing online enhancements. An example of an online enhancement process is described in FIG. 10. In other embodiments, the user application 102 and the web service application 106 are configured to use interprogram communication with event handling to configure the user application 102 and the web service application 106 for any other processes as would be appreciated by one of ordinary skill in the art upon viewing this disclosure.

The tagging engine 126 of the web service application 106 is in data communication with the tag library 152, the data collection engine 128, and the user application 102. The tagging engine 126 is configured to generate subscription tags 118 and logging tags 120 and to store and retrieve subscription tags 118 and logging tags 120 in the tag library 152. For example, a user may provide information to the tagging engine 126 that identifies one or more target data fields 114, the location of the target data fields 114, and triggering events. The tagging engine 126 may generate a subscription tag 118 using the provided information. In another example, a user may provide information to the tagging engine 126 that identifies one or more elements 116 and the location of the elements 116 on the user application 102. The tagging engine 126 may generate a logging tag 120 using the provided information. The tagging engine 126 is configured to send data content 127 comprising subscription tags 118 linked to data fields 114 and/or logging tags 120 linked to elements 116 to the user application 102. The subscription tags 118 and logging tags 120 may be code, script, or tags that are embedded within the data content 127 that is sent to the user application 102.

The user application 102 may be configured to receive the data content 127 comprising the subscription tags 118 and/or the logging tags 120 and to present the data content 127 on the user interface 112. In one embodiment, presenting the data content 127 or executing code linked with subscription tags 118 may configure the user application 102 for implementing subscription tagging. When the user application 102 is configured to implement subscription tagging, the user application 102 may send data 131 from one or more data fields 114 linked with a subscription tag 118 in response to a triggering event identified by the subscription tag 118.

In another embodiment, presenting the data content 127 or executing code linked with logging tags 120 may configure the user application 102 for implementing overlays 122. When the user application 102 is configured to implement overlays 122, the user application may send data 131 for one or more elements 116 in response to a user interacting with the elements 116. For example, the user application 102 may send data 131 in response to a user clicking on a hyperlink that is linked to a logging tag 120.

The user application 102 may also be configured to receive overlay data 135 for one or more overlays 122 from the mobile overlay engine 134 and to present overlays 122 with the elements 116 that are mapped to the overlays 122. Overlay data 135 may comprise instructions for implementing overlays 122 and/or data to be presented on the user application 102 using overlays 122. For example, the overlay data 135 may comprise instructions for the user application 102 to superimpose data onto elements 116 in the user interface 112 using overlays 122. In some embodiments, overlay data 135 may indicate whether or not to use overlays 122, how to present data using overlays 122 (e.g. collapsed view or expanded view), and any other suitable information for presenting data for elements 116 of the user application 102.

The data collection engine 128 is configured to receive data 131 from the user application 102 and to forward the received data 131 to the data feed engine 130 using a routing engine 202. The routing engine 202 is configured to receive routing instructions 203 from the data manager 138 and to forward the received data 131 to the data feed engine 130 with the routing instructions 203. The routing instructions 203 may identify one or more engines to forward data 131 based on hyperlink labels 148, user-defined labels 150, subscription tags 118, and logging tags 120 linked to the received data 131. For example, data 131 linked with a hyperlink label 148 or a user-defined label 150 may be forwarded to the online enhancement engine 132, data 131 linked with a logging tag 120 may be forwarded to the metric overlay engine 134, and data 131 linked with a subscription tag 118 may be forwarded to the operations engine 136, the behavior engine 142, and/or the fraud detection engine 144.

The data feed engine 130 is in data communication with the data manager 138, the reports manager 140, the metric overlay engine 134, the online enhancement engine 132, the operations engine 136, the behavior aggregator engine 142, and the fraud detection engine 144. The data feed engine 130 is configured to receive data from the data collection engine 128 and forward the data along one or more data feeds 204 to the metric overlay engine 134, the online enhancement engine 132, the operations engine 136, the behavior aggregator engine 142, and/or the fraud detection engine 144. In one embodiment, the data feed engine 130 may be configured to generate the one or more data feeds 204 and to forward data along the one or more data feeds 204 based on routing instructions 203 provided by the data manager 138 or the routing engine 202. In an embodiment, the routing engine 202 may provide the routing instructions 203 to the data feed engine 130. For example, the routing engine 202 may append the routing instructions 203 to data sent to the data feed engine 130. The data feed engine 130 be also be in data communication with one or more other devices or applications (not shown).

The metric overlay engine 134 may be configured to receive a data feed 204 from the data feed engine 130, to generate overlay data 135 based on the data feed 204, and to send the overlay data 135 to the user application 102. For example, the metric overlay engine 134 may be configured to use a parser 206 to parse a data feed 204 based on logging tags 120 that are linked to elements 116. The metric overlay engine 134 may be further configured to use a compiler 208 to aggregate the parsed data to generate the overlay data 135 for one or more overlays 122 mapped to the elements 116 linked with logging tags 120. The metric overlay engine 134 may be configured to send the overlay data 135 to the user application 102. An example of a process for generating overlay data 135 is described in FIG. 8.

The online enhancement engine 132 may be configured to receive a data feed 204 from the data feed engine 130 and to generate reports that are organized using user-defined labels 150. For example, the online enhancement engine 132 may be configured to use a parser 210 to parse a data feed 204 based on user-defined labels 150 that are linked to elements 116 of the user application 102. The online enhancement engine 132 may be further configured to use a compiler 212 to aggregate the parsed data to one or more reports that are organized based on the user-defined labels 150. Different users may be interested in different types of information about a user's behavior when using the user application 102. For example, a user may be interested in how a user interacts with advertisements on the user application 102 and in which elements 116 the user uses the most. In an embodiment, a user may express their interest in particular elements 116 by providing information to the reports manager 140 or the tagging engine 126 to generate reporting rules for generating reports. The online enhancement engine 132 allows reports to be generated based on the information that is of interest using the reporting rules.

The operations engine 136 may be configured to receive a data feed 204 from the data feed engine 130, to troubleshoot problems with a user application 102, and to generate a crash report based on the received data feed 204. For example, the data feed 204 may comprise user data from the user application 102 and touch screen gesture data. The touch screen gesture data may identify one or more gestures used by the user on a touch screen of the user device 104. For example, the touch screen gesture data may indicate a finger gesture performed on a touch screen of a user device 104 and the number of fingers used to make the gesture. Examples of touch screen gestures include, but are not limited to, a single tap gesture, a double tap gesture, a press and hold gesture, a swipe up gesture, a swipe down gesture, a spread gesture, a pinch gesture, a rotate right gesture, and a rotate left gesture. The operations engine 136 may be configured to generate a crash report that comprises at least a portion of the user data from the user application 102 and at least a portion of the touch screen gesture data. Generating a crash report comprising information about a user's actions leading up to a problem with the user application 102 may allow for problems to be diagnosed and resolved more quickly. For example, the information about the user's actions (e.g. touch screen gesture information) may be used to recreate the issue and to allow potential solutions to be tested. In one embodiment, the operations engine 136 may be further configured to store generated reports and/or to output generated reports to one or more other devices or applications (not shown).

The behavior aggregator engine 142 may be configured to receive a data feed 204 from the data feed engine 130 and to aggregate the received data to based on the behavior of a user and/or the user application 102. The data feed 204 may comprise information indicating actions made by a user of the user application 102 and information submitted by the user. For example, the data feed 204 may comprise touch screen gesture information or information identifying actions made by the user. The behavior aggregator engine 142 may be configured to generate a behavior report that comprises user data and/or information about actions made by a user (e.g. touch screen gesture information). In one embodiment, the behavior aggregator engine 142 may be further configured to store generated reports and/or to output generated reports to one or more other devices or applications (not shown).

The fraud detection engine 144 may be configured to receive a data feed 204 from the data feed engine 130 and to process the received data to detect malicious or suspicious activities by a user using the user application 102. The data feed 204 may comprise information indicating actions made by a user, information submitted by the user, and/or information about the user application 102 or user device 104 used by the user, which may be used to detect malicious or suspicious activity. For example, a subscription tag 118 may be linked with a triggering event that is triggered when a user makes multiple social security number submissions within a predetermined amount of this time. This behavior may indicate that the user is trying to gain access to an account by trying numerous social security numbers. For instance, the user may be employing an agent script to try different social security numbers. When the triggering event occurs, the fraud detection engine 144 may determine that malicious or suspicious activity has occurred. The data feeds 204 for this subscription tag 118 may comprise an Internet Protocol (IP) address, a media access control (MAC) address, and/or any other information that may be used to identify the source of the malicious activity. In another example, a subscription tag 118 may be linked with a triggering event that is triggered when a user opens a new account and changes personal information and/or contact information (e.g. email addresses, phone numbers, and mailing addresses). This behavior may indicate that an account may be compromised and the user is attempting to hide suspicious activity by immediately changing the contact information for the account. Other examples of triggering events for the fraud detection engine 144 may include, but are not limited to, multiple password submissions within a predetermined time period, money transfers, and changes to investment portfolios (e.g. trading in new areas). In one embodiment, the fraud detection engine 144 may be further configured to generate a fraud detection report that comprises information indicating actions made by a user, information submitted by the user, and/or information about the user application 102 or user device 104 used by the user. The fraud detection engine 144 may also be configured to output generated reports to one or more other devices or applications (not shown). In one embodiment, the fraud detection engine 144 may be configured to trigger a fraud alert in response to detecting malicious or suspicious activity. Examples of fraud alerts include, but are not limited to, an email, a notification messages, and a pop-up on the web service application 106.

FIG. 3 is a screenshot of an embodiment of a user interface 112 of a user application 102. For example, user interface 112 may be a web page, part of a desktop application, or part of a mobile application. In FIG. 3, the user interface 112 is configured to receive personal information from a user. The user interface 112 presents a multiple questions to the user and allows the user to provide their personal information using data fields 114. The data fields 114 may allow the user to select a response from a group of responses using radio buttons and scroll bars or to provide a text input. For example, the user interface 112 allows the user to indicate whether they are a permanent resident of the United States, to indicate their country of citizenship, and to provide their name, permanent address, date of birth, and social security number. Responses to one or more of the data fields 114 may be optional. The user interface 112 may also comprise one or more elements 116 for the user to interact with. For example, the user interface 112 comprises a submit button element 116 and a cancel button element 116. In other examples, the user interface 112 may also be configured with any other data fields 114 and/or elements 116.

In an embodiment, the user interface 112 may be provided to the user application 102 from the web service application 106 as data content 127. One or more of the data fields 114 may be linked to subscription tags 118. An example, the first name data field 114, the last name data field 114, and the social security data field 114 may be target data fields 114 linked to a subscription tag 118. The subscription tag 118 may provide instructions or may indicate for the user application 102 to send the data content from the first name data field 114, the last name data field 114, and the social security data field 114 in response to the user initiating a triggering event, for example, pressing the submit button element 116.

FIG. 4 is a screenshot of an embodiment of a tag publisher 400 for generating site level subscription tags 118. The tag publisher 400 may be implemented by the tagging engine 126 in the web service application 16 to allow a user to generate subscription tags 118. The tag publisher 400 may allow the user to identify target data fields 114, to indicate the location of one or more target data fields 114 to be linked to a subscription tag 118, and to indicate triggering events for the subscription tag 118. The tag publisher 400 may also be configured to allow the user to provide code or logic for the subscription tag 118. Subscription tags 118 generated by the tag publisher 400 may be stored in a tag library 152 and/or embedded within data content 127 that is sent to the user application 102.

In the example shown in FIG. 4, the tag publisher 400 comprises a site identifier (ID) data field 402 and an application uniform resource locator (URL) data field 402 that allows the user to indicate the location of target data fields 114 within a particular website. The tag publisher 400 further comprises a plurality of tag flag data fields 404 that allows the user to identify triggering events for a subscription tag 118. The tag publisher 400 further comprises a custom code data field 406 that allows the user to provide code for the subscription tag 118. The custom code data field 406 may allow the user to identify target data fields 114, to indicate the location of the target data fields 114, to indicate triggering events for a subscription tag 118, and/or to provide logic or instructions for obtaining data from the target data fields 114 in response to triggering events.

FIG. 5 is a screenshot of another embodiment of a tag publisher 500 for generating page level subscription tags 118. Tag publisher 500 may be configured to generate subscription tags 118 similarly to the tag publisher 400 described in FIG. 4. Tag publisher 500 allows a user generate and configure a subscription tag 118 for a particular webpage of a website. In the example shown in FIG. 5, the tag publisher 500 comprises a side ID data field 502, a page ID data field 502, and a page URL data field 502 that allows the user to indicate the location of target data fields 114 within a particular webpage of a website. The tag publisher 500 further comprises a plurality of tag flag data fields 504 that allows the user to identify triggering events for a subscription tag 118. The tag publisher 500 further comprises a custom code data field 506 that allows the user to provide code for a subscription tag 118 similarly to as described in FIG. 4.

Figure 6:
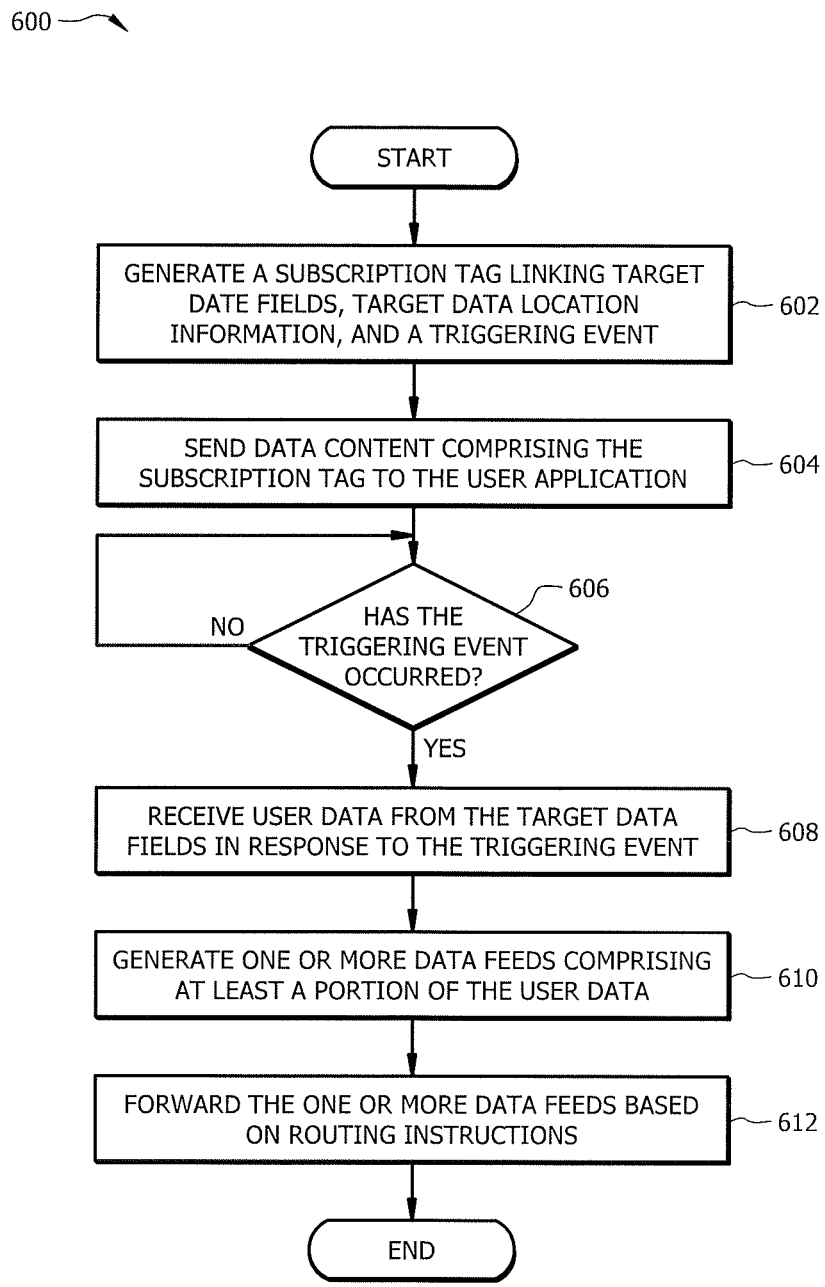
FIG. 6 is a flowchart of an embodiment of a subscription tagging method using interprogram communication between a web service application and a user application.

FIG. 6 is a flowchart of an embodiment of a subscription tagging method 600 using interprogram communication between a web service application 106 and a user application 102. Method 600 may be employed by the web service application 106 to retrieve specific user information and/or information about a user actions from a user application 102. The web service application 106 may process the data from the user application 102 to troubleshoot problems with the operation of the user application 102, to monitor the behavior of a user using the user application 102, and/or to detect malicious or suspicious activities from a user using the user application 102.

At step 602, the web service application 106 generates a subscription tag 118 linking target data fields 114, target data location information, and a triggering event. The tagging engine 126 may receive input from a user of the web service application 106 to generate the subscription tag 118 that identifies information from the user application 102 to send in response to the triggering event. For example, a subscription tag 118 may be linked with a triggering event that is triggered when a user makes multiple password submission within a predetermined amount of time. The subscription tag 118 may indicate for the user application 102 to send account information and an IP address and/or a MAC address for the user device 104 executing the user application 102.

At step 604, the web service application 106 sends data content 127 comprising the subscription tag 118 to the user application 102. For example, the subscription tag 118 may be embedded with the data content 127 as a JavaScript tag. In other examples, the subscription tag 118 may be encoded with the data content 127 using any other suitable type of encoding, scripting, or tagging.

At step 606, the web service application 106 determines whether the triggering event has occurred. In one embodiment, the web service application 106 may determine that the triggering event has occurred in response to receiving data 131 at the data collection engine 128 from the user application 102. In another embodiment, the web service application 106 may determine that the triggering event has occurred in response to receiving any other suitable indicator sent by the user application 102. The web service application 106 proceeds to step 608 when the triggering event has occurred. Otherwise, the web service application 106 continues to wait until the triggering event has occurred.

At step 608, the web service application 106 receives user data from the target data fields 114 in response to the triggering event. The web service application 106 may also receive information about a user's actions with the user application 102, for example, touch screen gesture information. In an embodiment, the data manager 138 may provide routing instructions 203 for the received data 131 based on the subscription tags 118 that are linked to the target data fields 114 where the data is received from.

At step 610, the web service application 106 generates one or more data feeds 204 comprising at least a portion of the user data. For example, the data feed engine 130 may generate a data feed 204 that comprises information for monitoring the operation of the user application 102 and/or troubleshooting problems (e.g. a crash) with the user application 102. As another example, the data feed engine 130 may generate a data feed 204 that comprises information reporting the behavior or activities of a user using the user application 102. As an another example, the data feed engine 130 may generate a data feed 204 that comprises information for detecting malicious activities using the user application 102.

At step 612, the web service application 106 forwards the one or more data feeds 204 based on routing instructions. For example, the data feed engine 130 may have received routing instructions 203 that indicate to forward the one or more data feeds 204 to an operations engine 136, a behavior engine 142, and/or a fraud detection engine 144 for processing. The web service application 106 may also forward to the one or more data feeds 204 to an external device for processing.

Figure 7:
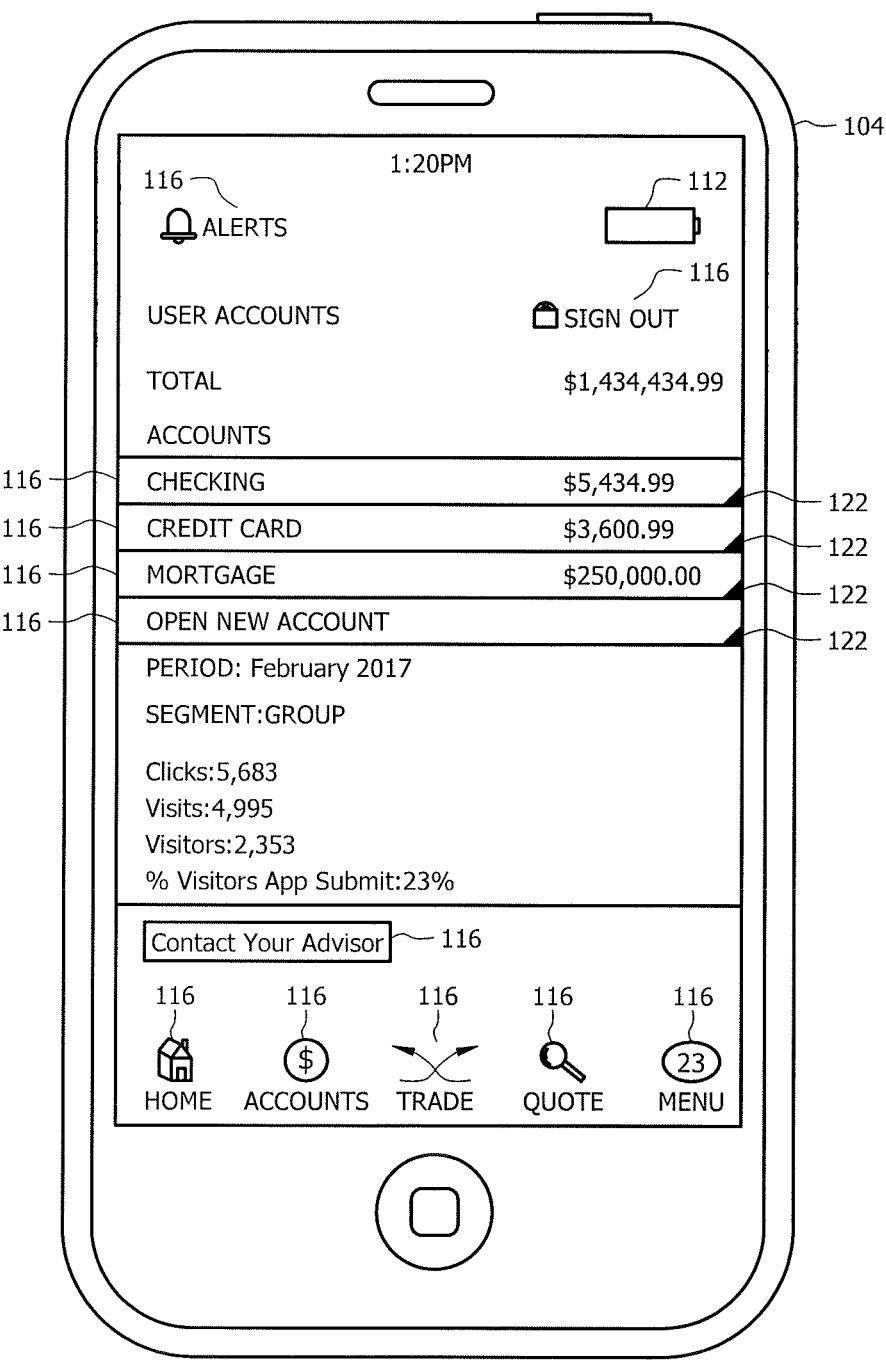
FIG. 7 is an embodiment of a user device implementing a user application with overlays.

FIG. 7 is an embodiment of a user device 104 implementing a user application 102 with overlays 122. The user interface 112 of the user application 102 comprises a plurality of elements 116 that provide information about a user's account and/or are hyperlinks that redirect the user to another location within the user application 102 when a user interacts with one of the elements 116. As an example, the user interface 112 comprises an alert element 116, a sign-out element 116, a checking information element 116, a credit card information element 116, a mortgage information element 116, an open new account element 116, a contact your advisor element 116, a home button element 116, an accounts button element 116, a trade button element 116, a quote button element 116, and a menu button element 116.

The user application 102 may receive data content 127 with instructions for implementing overlays 122 and/or comprising logging tags 120. In this example, the checking information element 116, the credit card information element 116, the mortgage element 116, and the open new account element 116 are linked to logging tags 120. The logging tags 120 are configured to capture and send information about the user's interaction with the elements 116 linked to logging tags 120. In an embodiment, the user application 102 is configured to send data for elements 116 linked with logging tags 120 and not to send data form elements 116 that are not linked with logging tags 120. The user application 102 is configured to receive overlay data 135 for the elements 116 linked with the logging tags 120 and to present the overlay data 135 as overlays 122 for the elements 116 linked with the logging tags 120. For example, the user application 102 may superimpose the overlays 122 onto the elements 116 linked with logging tags 120. Each overlay 122 may provide aggregated data for the elements 116. In FIG. 7, the overlays 122 for the checking information element 116, the credit card information element 116, and the mortgage information element 116 are shown in a collapsed or hidden view. When an overlay 122 is in a collapsed view, the overlay 122 indicates that aggregated data is available for an element 116, but the details of the aggregated data are not visible. The overlay 122 for the open new account element 116 is shown in an expanded view. When an overlay 122 is an expanded view, the overlay 122 indicates that aggregated data is available for an element 116 and displays the details of the aggregated data. In other examples, the user application 102 may use any other technique for using overlays 122 to indicate that aggregate data is available or to present aggregated data for elements 116 linked with logging tags 120.

Figure 8:
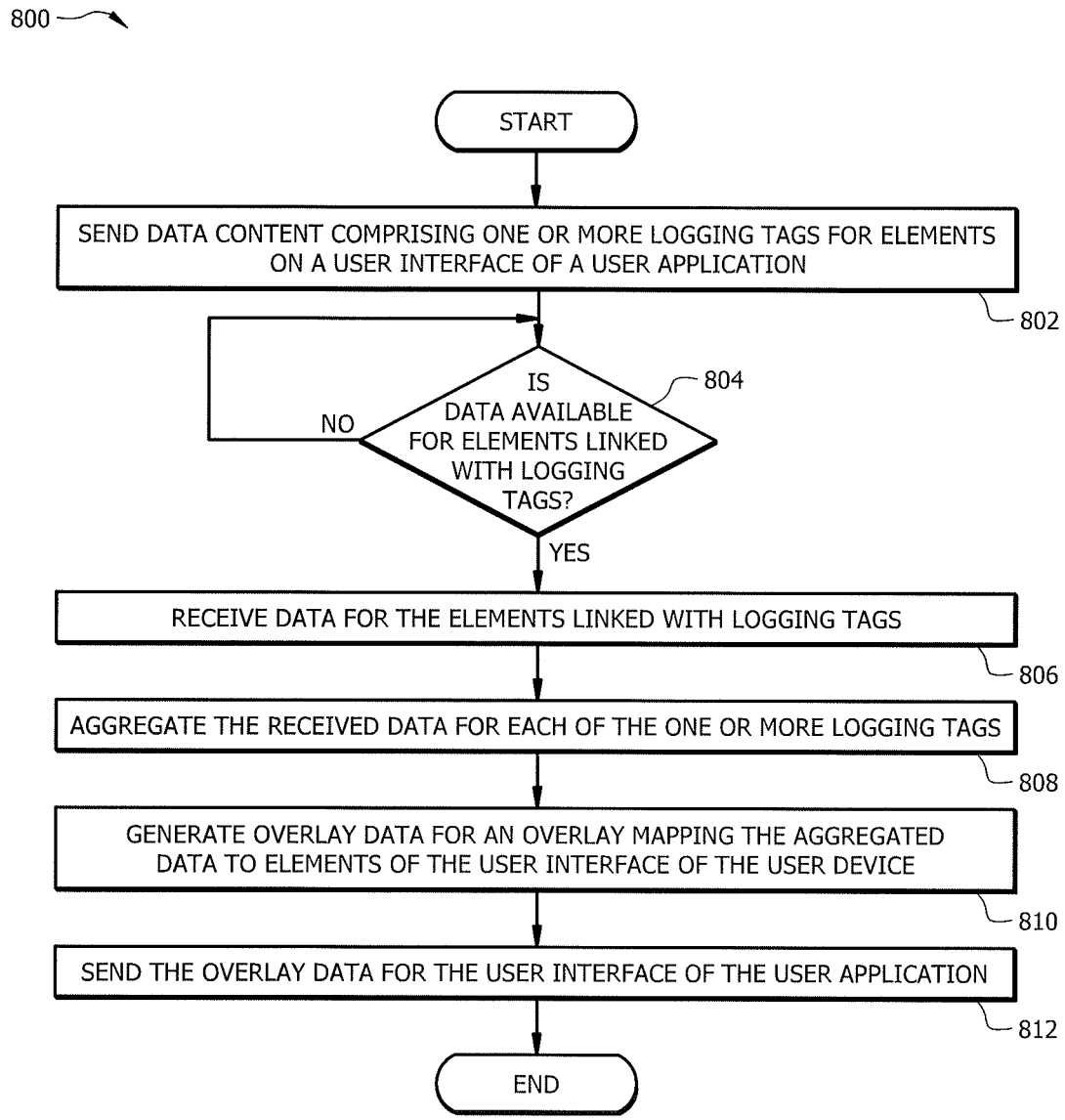
FIG. 8 is a flowchart of an embodiment an overlaying method using interprogram communication between a web service application and a user application.

FIG. 8 is a flowchart of an embodiment an overlaying method 800 using interprogram communication between a web service application 106 and a user application 102. Method 800 may be employed by the web service application 106 to retrieve specific information about a user's interactions with elements 116 on a user application 102 and to send overlay data 135 for overlays 122 that presents aggregated data for the elements 116 on the user application 102. In an embodiment, the user application 102 may use the overlays 122 to display information about how a user interacts with elements 116 of the user application 102.

At step 802, the web service application 106 sends data content 127 encoded with one or more logging tags 120 for elements 116 on a user interface 112 of the user application 102. For example, the web service application 106 may generate the one or more logging tags 120 using the tagging engine 126 based on information received from a user of the web service application 106. The logging tags 120 identify elements 116 of the user interface 112 of the user application 102 that the web service application 106 is interested in receiving information about from the user application 102.

At step 804, the web service application 106 determines whether data is available for the elements 116 linked with logging tags 120. In one embodiment, the web service application 106 may determine that data is available for elements 116 linked with logging tags 120 in response to receiving data 131 at the data collection engine 128 from the user application 102. In another embodiment, the web service application 106 may determine that data 131 is available for the elements 116 linked with logging tags 120 in response to receiving any other suitable indicator sent by the user application 102. The web service application 106 proceeds to step 806 when data 131 is available for the elements linked with logging tags 120. Otherwise, the web service application 106 continues to wait until data is available.

At step 806, the web service application 106 receives data for the elements 116 linked with logging tags 120. For example, the data collection engine 128 may parse the received data 131 for data for the elements 116 linked with logging tags 120 and forward the data for the elements 116 to the metric overlay engine 134.

At step 808, the web service application 106 aggregates the received data for each of the one or more logging tags 120. The metric overlay engine 134 may aggregate the data for each logging tag 120. For example, the metric overlay engine 134 may parse data received by the data collection engine 128 and the data feed engine 130 based on which logging tag 120 the data belongs to. The metric overlay engine 134 may aggregate the data by compiling or grouping data together based on the logging tag 120 the data belongs to. The aggregated data may indicate a number of times a user viewed an element 116, a number of times a user selected an element 116, types of touch screen gestures used to interact with an element 116, and/or any other information.

At step 810, the web service application 106 generates overlay data 135 for an overlay 122 mapping the aggregated data to elements 116 of the user interface 112 of the user application 102. In one embodiment, the overlay data 135 may comprise the aggregated data organized by logging tags 120 or overlays 122 linked to the logging tags 120. In other embodiments, the overlay data 135 may be organized in any other suitable manner. In some embodiments, the overlay data 135 may comprise instructions for how to present the aggregated data and/or overlays 122. For example, the overlay data 135 may comprise instructions to present the aggregated using overlays 122 in a collapsed view.

At step 812, the web service application 106 sends the overlay data 135 to the user application 102. The metric overlay engine 134 may send the overlay data 135 to the user application 102. The user application 102 may use the received metric overlay data 135 to present the aggregated data for elements 116 on the user interface 112 of the user application using overlays 122. For example, the user application 102 may superimpose metric overlay data 135 onto elements 116 of the user interface 112 using overlays 122. Providing overlay data 135 allows the user application 102 to dynamically present information about elements 116 of the user application 102 without modifying the source code of the user application 102.

Figure 9:
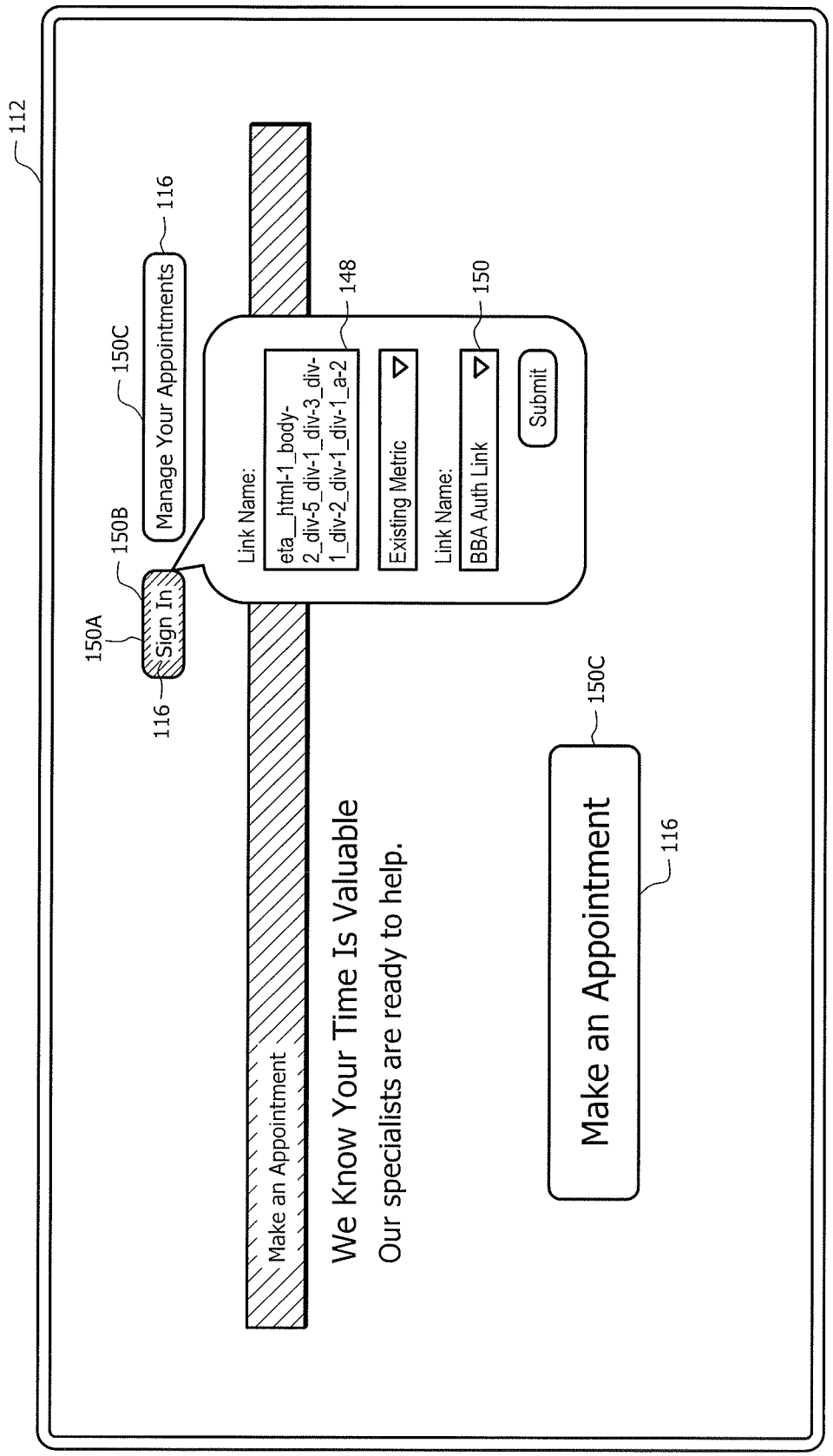
FIG. 9 is a screenshot of an embodiment of a user interface of a user application implementing online enhancements.

FIG. 9 is a screenshot of an embodiment of a user interface 112 of a user application 102 implementing online enhancements. For example, the user interface 112 may be a webpage, part of a desktop application, or part of a mobile application. The user interface 112 comprises a plurality of elements 116 that are hyperlinks which redirect a user to another location within the user application 102 when the user interacts with an element 116. As an example, the user interface 112 comprises a sign-in element 116, a manage your appointments element 116, and a make an appointment element 116.

The sign-in element 116, the manage your appointments element 116, and the make an appointment element 116 may be assigned a default hyperlink label 148 that is used to uniquely identify each of the elements 116. One or more user-defined labels 150 may be assigned to the sign-in element 116, the manage your appointments element 116, and the make an appointment element 116. The one or more user defined elements 116 may be generated and/or assigned by the web service application 106. In FIG. 9, a first user-defined label 150A and a second user-defined label 150B may be assigned to the sign-in element 116. Assigning multiple user-defined labels 150 to the same element 116 allows multiple notifications to be sent when a user interacts with the element 116. This allows the ability for the element 116 to trigger multiple events simultaneously. A third user-defined label 150C may be assigned to the manage your appointments element 116 and the make an appointment element 116. Assigning the same user-defined label 150 to multiple elements allows notifications to be sent when a user interacts with any of the elements 116.

In this example, the first user-defined label 150A, the second user-defined label 150B, and the third user-defined label 150C are all different labels and are different from the hyperlink labels 148 assigned to the elements 116. When a user interacts with (e.g. clicks on) the sign-in element 116, the manage your appointments element 116, and the make an appointment element 116 the user application 102 sends data 131 that notifies the web service application 106. The data 131 may comprise data that identifies the user-defined labels 150 for the elements 116 the user interacted with. For instance, if a user clicks on the sign-in element 116 then the user application 102 may send data that comprises the first user-defined element 150A and the second user-defined element 150B. The user application 102 may send data that comprise the third user-defined label 150 when a user clicks on either the manage your appointments element 116 or the make an appointment element 116.

Figure 10:
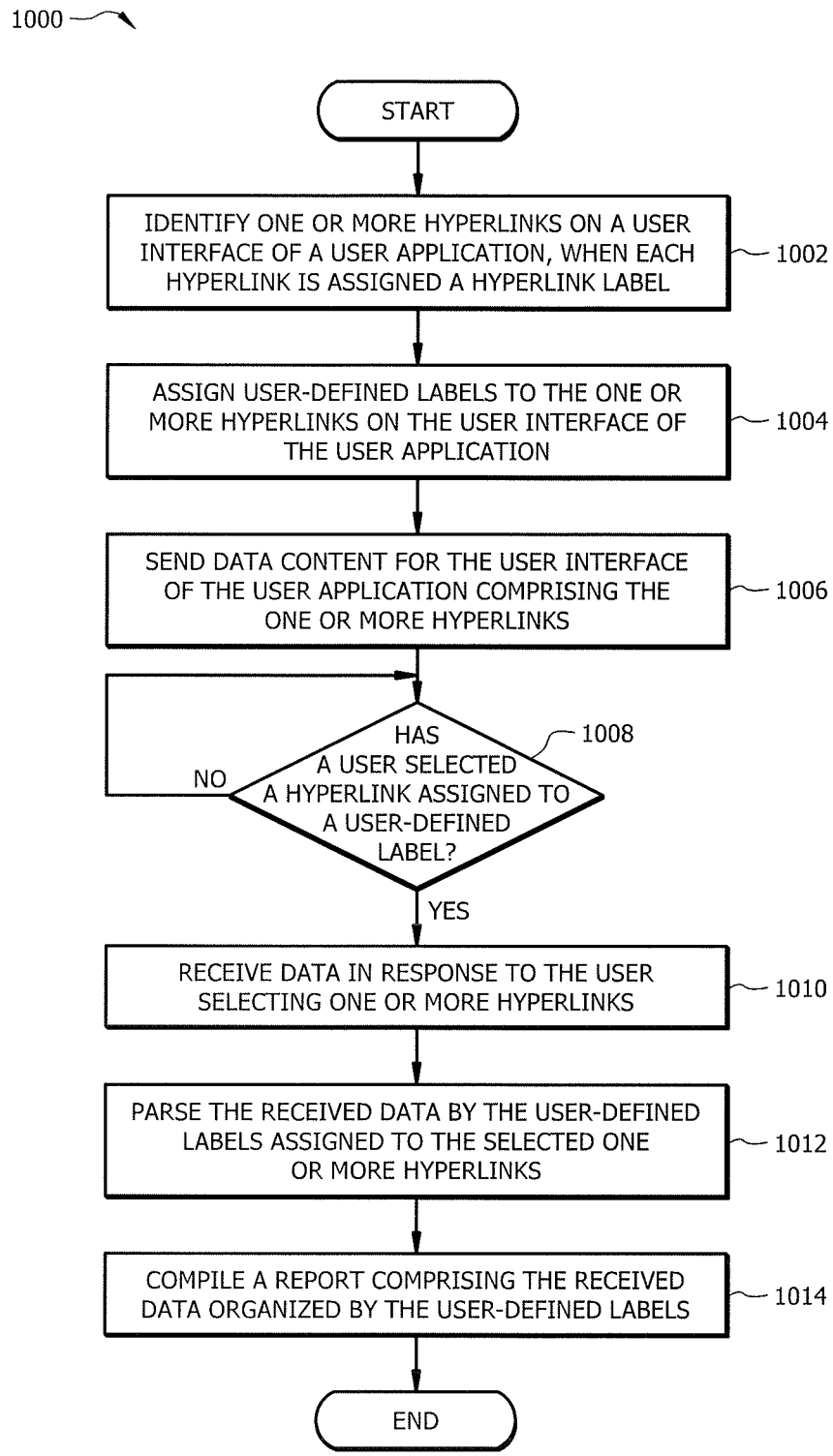
FIG. 10 is a flowchart of an embodiment of an online enhancement method using interprogram communication between a web service application and a user application.

FIG. 10 is a flowchart of an embodiment of an online enhancement method 1000 using interprogram communication between a web service application 106 and a user application 102. Method 1000 may be employed by the web service application 106 to retrieve data about a user's actions with elements 116 on a user application 102 and to provide the retrieved data for processing and/or analysis.

At step 1002, the web service application 106 identifies one or more elements 116 (e.g. hyperlinks) on a user interface 112 of the user application 102. Each hyperlink is assigned to a hyperlink label 148 generated during a development when the hyperlinks are created.

At step 1004, the web service application 106 assigns user-defined labels 150 to the one or more hyperlinks on the user interface 112 of the user application 102. For example, a user may employ the tagging engine 126 to identify a hyperlink to assign with a user-defined label 150. The user may then define a user-defined label 150 and assign the user-defined label 150 to the identified hyperlink. The user-defined label 150 is different than the hyperlink label 148. In one embodiment, the web service application 106 may assign one or more user-defined labels 150 to the same hyperlink. The web service application 106 may also assign the same user-defined label 150 to a plurality of hyperlinks.

At step 1006, the web service application 106 sends data content 127 for the user interface 112 of the user application 102. The user interface 112 comprises the one or more hyperlinks assigned to user-defined labels 150. The user application 102 presents the one or more hyperlinks to its users using the user interface 112.

At step 1008, the web service application 106 determines whether a user has selected one or more of the hyperlinks assigned to a user-defined label 150. In one embodiment, the web service application 106 may determine that a user has selected one or more of the hyperlinks assigned to a user-defined label 150 in response to receiving data 131 at the data collection engine 128 from the user application 102. In another embodiment, the web service application 106 may determine that a user has selected one or more of the hyperlinks assigned to a user-defined label 150 in response to receiving any other suitable indicator sent by the user application 102. The web service application 106 proceeds to step 1010 when a user has selected one or more of the hyperlinks assigned to a user-defined label 150. Otherwise, the web service application 106 continues to wait until the user has selected a hyperlink assigned to a user-defined label 150.

At step 1010, the web service application 106 receives data 131 in response to the user selecting one or more hyperlinks assigned to a user-defined label 150 from the user application 102. In one embodiment, the data 131 may comprise a flag or identifier that identifies the hyperlink label 148 for the selected hyperlink, the user-defined labels 150 for the selected hyperlink, a number of times a user viewed content linked with a hyperlink, information about a user's actions (e.g. touch screen gesture information), or any other information. The data collection engine 128 may forward the received data 131 to the online enhancement engine 132.

At step 1012, the web service application 106 parses the received data by the user-defined labels 150 assigned to the selected one or more hyperlinks. For example, the online enhancement engine 132 may parse the data received by the data collection engine 128 and the data feed engine 130 based on the user-defined labels 150.

At step 1014, the web service application 160 compiles a report comprising the received data organized by the user-defined labels 150. The online enhancement engine 132 may aggregate the data by compiling or grouping the data together based on the user-defined labels 150. The online enhancement engine 132 may generate the report such that the report is organized based on the user-define labels 150. In an embodiment, the online enhancement engine 132 may filter out data for one or more user-defined labels 150 and may generate the report based on the filtered data. In an embodiment, the web service application 106 may identify data for a user-defined label 150 assigned to multiple hyperlinks and may discard data identifying the user-defined label 150 when a subsequent hyperlink assigned to the user-defined label 150 is selected. In other words, the web service application 106 may discard data for a user-defined label 150 that is received after data has already been received that identifies the user-defined label 150. In another embodiment, the web service application 106 discard data that is received for hyperlinks that are not assigned to user-defined labels 150.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A web service tagging tool comprising:
a memory operable to store logging tags; and
a web service application operably coupled to the memory, and comprising:
  a tagging engine configured to:
    generate a subscription tag linking target data fields, target data location information, and a triggering event, wherein:
      the target data fields identifies one or more user data fields on a user interface of a user application;
      the target data location information identifies a location of the target data fields on the user interface; and
      the triggering event identifies an event for sending data from the target data fields;
    send data content comprising the subscription tag to the user application; and
    send data content comprising one or more logging tags for the user interface of the user application, wherein each of the one or more logging tags is linked to:
      an element of the user interface, wherein the element comprises a hyperlink; and
      location information identifying a location of the element in the user application;
  a data collection engine configured to:
    receive data for the element linked with the one or more logging tags; and
    aggregate the received data for each of the one or more logging tags;
  a data feed engine operably coupled to the data collection engine, and configured to:
    generate one or more data feeds comprising at least a portion of the user data;
    forward the one or more data feeds based on routing instructions; and
    forward at least one data feed of the one or more data feeds to an operations engine, the at least one data feed comprising user data comprising touch screen gesture data identifying one or more gestures by a user, the operations engine is configured to generate a crash report comprising the at least a portion of the user data and at least a portion of the touch screen gesture data; and
  a metric overlay engine operably coupled to the data collection engine, and configured to:
    generate overlay data for an overlay mapping the aggregated data to elements of the user interface of the user application, wherein the overlay displays the aggregated data overlaid with mapped elements on the user interface of the user device; and
    send the overlay data to the user application.

2. The apparatus of claim 1, wherein the overlay data comprises instructions for implementing the overlay.

3. The apparatus of claim 1, wherein:
the user application is a mobile application, and
sending the one or more logging tags does not modify the source code for the mobile application.

4. The apparatus of claim 1, wherein the aggregated data indicates the number of times a user viewed the element.

5. The apparatus of claim 1, wherein the aggregated data indicates a number of times a user selected the element.

6. The apparatus of claim 1, wherein the aggregated data indicates a type of touch screen gesture used to interact with the element.

7. The apparatus of claim 1, wherein the overlay visually modifies the user interface to indicate that the aggregated data is available.

8. An interprogram overlaying method comprising:
sending, by a tagging engine, data content comprising one or more logging tags for a user interface of a user application, wherein each of the one or more logging tags is linked to:
  an element of the user interface, wherein the element comprises a hyperlink; and
  location information identifying a location of the element in the user application;
generating, by the tagging engine, a subscription tag linking target data fields, target data location information, and a triggering event, wherein:
  the target data fields identifies one or more user data fields on a user interface of a user application;
  the target data location information identifies a location of the target data fields on the user interface; and
  the triggering event identifies an event for sending data from the target data fields;
sending, by the tagging engine, data content comprising the subscription tag to the user application;
receiving, by a data collection engine, data for the element linked with the one or more logging tags;
aggregating, by the data collection engine, the received data for each of the one or more logging tags;
generating, by a data feed engine operably coupled to the data collection engine, one or more data feeds comprising at least a portion of the user data;
forwarding, by the data feed engine, the one or more data feeds based on routing instructions;
forwarding, by the data feed engine, at least one data feed of the one or more data feeds to an operations engine, the at least one data feed comprising user data comprising touch screen gesture data identifying one or more gestures by a user, the operations engine is configured to generate a crash report comprising the at least a portion of the user data and at least a portion of the touch screen gesture data;
generating, by a metric overlay engine, overlay data for an overlay mapping the aggregated data to elements of the user interface of the user application, wherein the overlay displays the aggregated data overlaid with mapped elements on the user interface of the user device; and
sending, by the metric overlay engine, the overlay data to the user application.

9. The method of claim 8, wherein the overlay data comprises instructions for implementing the overlay.

10. The method of claim 8, wherein:
the user application is a mobile application, and
sending the one or more logging tags does not modify the source code for the mobile application.

11. The method of claim 8, wherein the aggregated data indicates the number of times a user viewed the element.

12. The method of claim 8, wherein the aggregated data indicates a number of times a user selected the element.

13. The method of claim 8, wherein the aggregated data indicates a type of touch screen gesture used to interact with the element.

14. The method of claim 8, wherein the overlay visually modifies the user interface to indicate that the aggregated data is available.

15. A computer program product comprising executable instructions stored in a non-transitory computer readable medium such that when executed by a processor causes the processor to:
- send, using a tagging engine, data content comprising one or more logging tags for a user interface of a user application, wherein each of the one or more logging tags is linked to:
  - an element of the user interface, wherein the element comprises a hyperlink; and
  - location information identifying a location of the element in the user application;
- generate, using the tagging engine, a subscription tag linking target data fields, target data location information, and a triggering event, wherein:
  - the target data fields identifies one or more user data fields on a user interface of a user application;
  - the target data location information identifies a location of the target data fields on the user interface; and
  - the triggering event identifies an event for sending data from the target data fields;
- send, using the tagging engine, data content comprising the subscription tag to the user application;
- receive, using a data collection engine, data for the element linked with the one or more logging tags;
- aggregate, using the data collection engine, the received data for each of the one or more logging tags;
- generate, by a data feed engine operably coupled to the data collection engine, one or more data feeds comprising at least a portion of the user data;
- forward, by the data feed engine, the one or more data feeds based on routing instructions;
- forward, by the data feed engine, at least one data feed of the one or more data feeds to an operations engine, the at least one data feed comprising user data comprising touch screen gesture data identifying one or more gestures by a user, the operations engine is configured to generate a crash report comprising the at least a portion of the user data and at least a portion of the touch screen gesture data;
- generate, using a metric overlay engine, overlay data for an overlay mapping the aggregated data to elements of the user interface of the user application, wherein the overlay displays the aggregated data overlaid with mapped elements on the user interface of the user device; and
- send, using the metric overlay engine, the overlay data to the user application.

16. The computer program product of claim 15, wherein:
the user application is a mobile application, and
sending the one or more logging tags does not modify the source code for the mobile application.

17. The computer program product of claim 15, wherein the aggregated data indicates the number of times a user viewed the element.

18. The computer program product of claim 15, wherein the aggregated data indicates a number of times a user selected the element.

19. The computer program product of claim 15, wherein the aggregated data indicates a type of touch screen gesture used to interact with the element.

20. The computer program product of claim 15, wherein the overlay data comprises instructions for implementing the overlay.

* * * * *